United States Patent
Hum et al.

(10) Patent No.: US 8,077,788 B2
(45) Date of Patent: Dec. 13, 2011

(54) SOFT DEMAPPING FOR MIMO DECODING

(75) Inventors: Eddy Hum, Ottawa (CA); Ming Jia, Ottawa (CA)

(73) Assignee: Rockstar Bidco, LP, New York, NY (US)

( * ) Notice: Subject to any disclaimer, the term of this patent is extended or adjusted under 35 U.S.C. 154(b) by 1047 days.

(21) Appl. No.: 11/948,675

(22) Filed: Nov. 30, 2007

(65) Prior Publication Data

US 2008/0130775 A1 Jun. 5, 2008

Related U.S. Application Data

(60) Provisional application No. 60/868,176, filed on Dec. 1, 2006.

(51) Int. Cl.
*H04L 5/12* (2006.01)
*H04L 23/02* (2006.01)
(52) U.S. Cl. ......... 375/262; 375/354; 370/491; 370/500
(58) Field of Classification Search ................... 375/262
See application file for complete search history.

(56) References Cited

U.S. PATENT DOCUMENTS

| | | | |
|---|---|---|---|
| 2005/0018789 A1* | 1/2005 | Jia et al. | 375/316 |
| 2006/0018415 A1 | 1/2006 | Jung et al. | |
| 2006/0045200 A1 | 3/2006 | Bocquet | |

OTHER PUBLICATIONS

Notice of Allowance and Fee(s) Due, mailed Dec. 17, 2010 for U.S. Appl. No. 11/948,644.

* cited by examiner

*Primary Examiner* — David C. Payne
*Assistant Examiner* — Tanmay Shah
(74) *Attorney, Agent, or Firm* — Withrow & Terranova, PLLC

(57) ABSTRACT

A look-up table having distance information corresponding to a distance between a potential candidate symbol and a most proximate competing symbol for each bit of a plurality of potential candidate symbols is provided for a given modulation type. A MIMO decoder will obtain multiple candidate symbols that are provided in a maximum likelihood solution and that correspond to each of the antenna layers of a MIMO wireless communication system. A first candidate symbol is selected from the plurality of candidate symbols, wherein the first candidate symbol corresponds to a first potential candidate symbol of the candidate symbols provided in the look-up table. Distance information is obtained from the look-up table for each bit of the first potential candidate symbol. Likelihood indicium is determined for each bit of the first candidate symbol as a function of the distance information that was obtained for each bit.

25 Claims, 7 Drawing Sheets

SOFT DEMAPPING FOR MIMO DECODING

CROSS-REFERENCE TO RELATED APPLICATIONS

This application claims the benefit of U.S. provisional application Ser. No. 60/868,176 filed Dec. 1, 2006, the disclosure of which is incorporated herein by reference in its entirety.

This application is related to U.S. utility application Ser. No. 12/948,644 filed concurrently herewith and entitled ANTENNA SELECTION FOR MIMO DECODING, the disclosure of which is incorporated herein by reference in its entirety.

FIELD OF THE INVENTION

The present invention relates to wireless communications, and in particular to enhanced Multiple Input Multiple Output decoding.

BACKGROUND OF THE INVENTION

Wireless communications have become ubiquitous in modern society, and with the ever-increasing demand for bandwidth, there are significant pressures to increase the effective bandwidth in wireless communication systems. One technique for increasing bandwidth in a wireless communication system is to employ spatial diversity, where different data streams are transmitted from multiple transmit antennas to multiple receive antennas of a receiving device. The data streams may be transmitted from different devices that have a single antenna, from a single device that has multiple antennas, or any combination thereof. Systems that use multiple transmit antennas and multiple receive antennas are generally referred to as Multiple Input Multiple Output (MIMO) systems.

Certain MIMO systems are configured to employ spatial multiplexing, where the different data streams are transmitted at the same time using the same communication resource, such as a particular carrier or sub-carrier. Although each data stream is only transmitted from one transmit antenna, all of the data streams are received at each of the multiple receive antennas. The different data streams propagate over different paths and tend to interfere with one another as they are transmitted from the respective transmit antennas to the receive antennas. As such, a different aggregation of all of the transmitted data streams is received at each of the receive antennas.

To recover each of the originally transmitted data streams from the aggregated signals that are received at each of the receive antennas, the receiving device employs a MIMO decoder. The MIMO decoder essentially processes the aggregated signals to extract each of the originally transmitted data streams. This extraction process is computationally intensive and involves significant amounts of matrix manipulation, such as matrix addition, subtraction, division, inversion, and the like. To further complicate matters, these computations are iterative in nature and generally need to be provided on a symbol-by-symbol basis for each of the transmitted data streams.

While wireless systems are expected to provide everhigher performance to meet consumer demand, equipment providers are under continuous pressure by service providers and consumers to provide the performance enhancements at lower costs. Unfortunately, computational power and the costs are directly related. Since MIMO decoding is one of the most computationally intensive processes in a MIMO receiver, there is a need for a technique to reduce the complexity of the computations for the extraction process provided by the MIMO decoder. There is a further need to reduce the complexity of the computations without negatively impacting the overall performance of the MIMO receiver.

SUMMARY OF THE INVENTION

The present invention relates to efficient and effective soft demapping in a MIMO decoder for use in a MIMO wireless communication system. Signals that are received via multiple antennas are processed by pre-demodulation circuitry to provide received symbols for use by the MIMO decoder. The MIMO wireless communication system supports multiple antenna layers. Each antenna layer is associated with a transmitted data stream that was transmitted from a different transmit antenna. In one embodiment, a look-up table having distance information corresponding to a distance between a potential candidate symbol and a most proximate competing symbol for each bit of a plurality of potential candidate symbols is provided for a given modulation type. If the different antenna layers employ different types of modulation, the look-up table may include corresponding distance information for each modulation type. The MIMO decoder will obtain multiple candidate symbols that are provided in a maximum likelihood solution and that correspond to each of the antenna layers of the MIMO wireless communication system. A first candidate symbol is selected from the plurality of candidate symbols, wherein the first candidate symbol corresponds to a first potential candidate symbol of the candidate symbols provided in the look-up table. Distance information is obtained from the look-up table for each bit of the first potential candidate symbol. Likelihood indicium is determined for each bit of the first candidate symbol as a function of the distance information that was obtained for each bit. The likelihood indicium for a given bit is indicative of the likelihood that a value for the given bit is a logic 1 or a logic 0.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
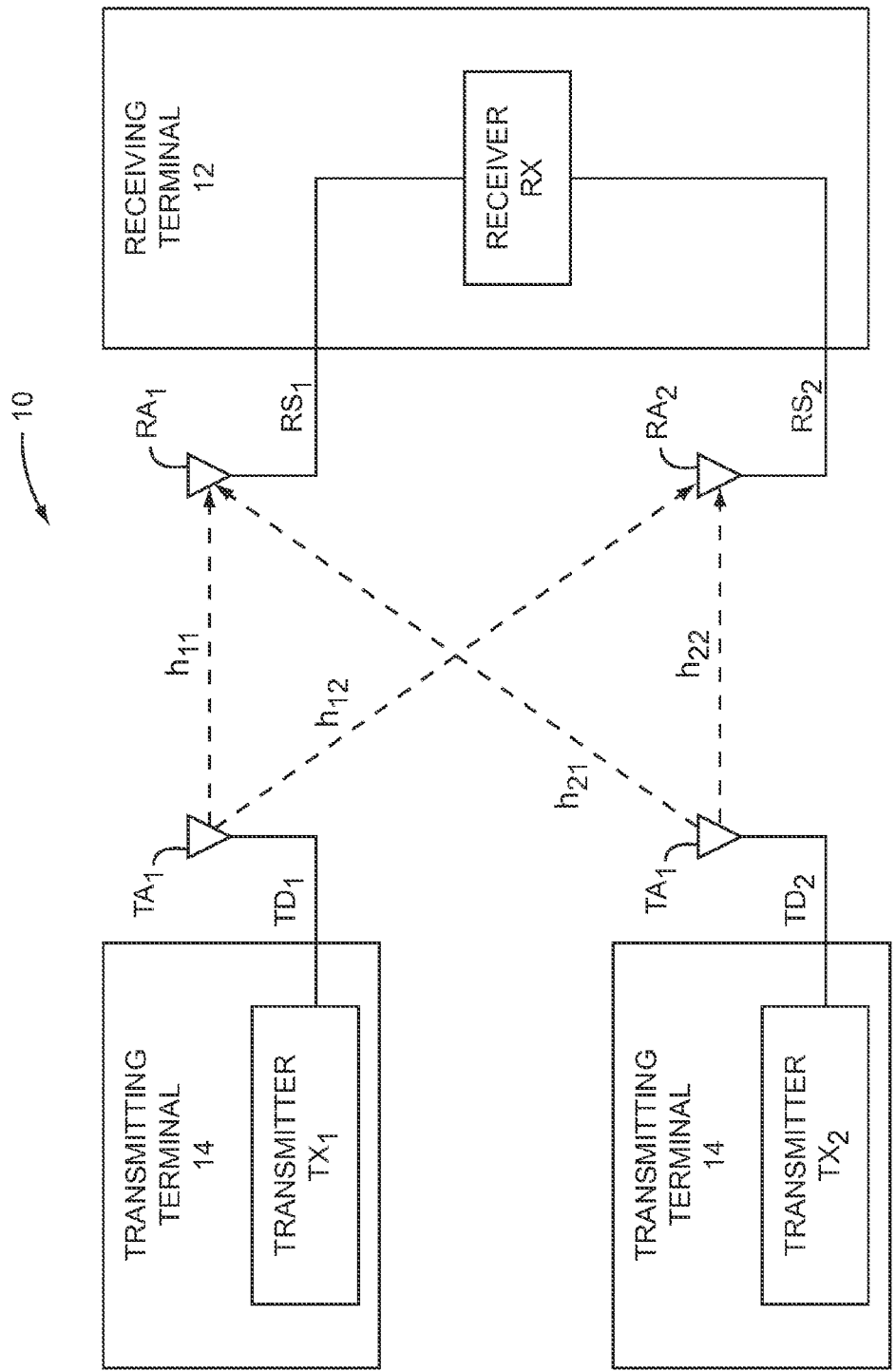
FIG. 1 is a block representation of a MIMO communication environment according to one embodiment of the present invention.

Although the concepts of the present invention may be used in various communication systems, these concepts are particularly applicable to the IEEE 802.16 standard, which is commonly referred to as the WiMAX standard. As illustrated in FIG. 1, a MIMO system 10 will employ multiple transmit antennas $TA_n$ and multiple receive antennas $RA_m$ to facilitate communications, wherein n and m represent the number of transmit antennas and receive antennas, respectively. Generally, the different receive antennas $RA_m$ for a MIMO system 10 are coupled to a single receiver RX of a receiving terminal 12. As depicted, each of a number of transmitting terminals 14 may have one transmitter $TX_n$ and an associated transmit antenna $TA_n$, where multiple transmitting terminals 14 cooperate to provide MIMO communications with a given receiving terminal 12. In other embodiments, a single transmitting terminal 14 may have and use multiple transmit antennas $TA_n$ to support MIMO communications with the receiving terminal 12.

The MIMO system 10 employs the multiple transmit antennas $TA_n$, to transmit different data streams $TD_n$ to the different receive antennas RAm at substantially the same time while using the same wireless resource, such as a carrier or Orthogonal Frequency Division Multiplexed (OFDM) subcarrier. In operation, a first transmit antenna $TA_1$ transmits a first data stream $TD_1$ using a selected wireless resource, a second transmit antenna $TA_2$ transmits a second data stream $TD_2$ using the same wireless resource, and so on and so forth. Since the data streams $TD_n$ are transmitted using the same wireless resource at substantially the same time, the data streams tend to combine and interfere with each other in various ways as they propagate toward the receive antennas $RA_m$. As such, each receive antenna $RA_m$ will receive a different receive signal $RS_m$, each of which represents a unique composite of all of the data streams $TD_n$ that were transmitted from the different transmit antennas $TA_n$. The composite signals are presented to the receiver RX for processing, as will be described further below.

The effective communication path between any one transmit antenna $TA_n$ and any one receive antenna $RA_m$ is often referred to as a channel. Each channel is associated with a transfer function, h, which represents the impact the particular channel has on the transmitted data streams $TD_n$. As illustrated, there are two transmit antennas $TA_1$, $TA_2$ and two receive antennas $RA_1$, $RA_2$, which use four channels. The transfer function, $h_{tr}$, for each channel is represented where t and r identify the corresponding transmit antennas, $TA_1$, $TA_2$ and receive antennas $RA_1$, $RA_2$, respectively, for the given channel. Thus, the channel between transmit antenna $TX_1$ and receive antenna $RA_2$ has a transfer function $h_{12}$.

As noted, each received signal $RS_m$ is a unique composite of all of the transmitted data streams $TD_n$, and in particular, each received signal $RS_m$ is a unique composite of all of the transmitted data streams $TD_n$ in light of the transfer functions $h_{tr}$ for the corresponding channels. The received signals $RS_m$ are mathematically represented in general as follows:

$$RS_1 = h_{11}TD_1 + h_{21}TD_2 + \ldots h_{n1}TD_n;$$
$$RS_2 = h_{12}TD_1 + h_{22}TD_2 + \ldots h_{n2}TD_n;$$
$$\vdots$$
$$RS_m = h_{1m}TD_1 + h_{2m}TD_1 + \ldots h_{nm}TD_n,$$

and in matrix form as a received signal vector $\vec{r}$:

$\vec{r} = H\vec{t}$, where:

the transmitted data stream $TD_n$ can be represented by a vector $\vec{t} = [TD_1, TD_2, \ldots TD_n]$;

the received signals $RS_m$ can be represent as a vector $\vec{r} = [RS_1, RS_2, \ldots RS_n]$; and the overall transfer function of the MIMO system can be represented in matrix form by:

$$H = \begin{bmatrix} h_{11} & h_{21} & \cdots & h_{n1} \\ h_{12} & h_{22} & \cdots & h_{n2} \\ \vdots & \vdots & & \vdots \\ h_{1m} & h_{2m} & \cdots & h_{nm} \end{bmatrix}.$$

The goal of the receiver RX is to recover each of the originally transmitted data streams $TD_n$ based on the received signals $RS_m$, which are received at each of the receive antennas $RA_m$. The receiver can determine the channel transfer functions $h_{tr}$ for each pertinent channel using known channel estimating techniques and create an appropriate channel matrix H for the MIMO system. Since the receiver RX has the received signal vector $\vec{r}$ and the overall channel matrix H, the receiver RX can readily determine the transmitted data vector $\vec{t}$, and thus, each of the transmitted data streams. In particular, since $\vec{r} = H\vec{t}$, solving for transmitted data vector $\vec{t}$ provides:

$\vec{t} = H^{-1}\vec{r}$, where the received signal vector $\vec{r}$ and the channel matrix H are known and $H^{-1}$ is the Moore-Penrose pseudo inverse of channel matrix H.

This process is equivalent to estimating for X unknown variables with X or more equations using matrix manipulation. Notably, each element of the calculated transmitted data vector $\vec{t}$ corresponds to a symbol in one of the originally transmitted data streams $TD_n$. Thus, a symbol for each of the originally transmitted data streams $TD_n$ is available once the transmitted data vector $\vec{t}$ is calculated.

Figure 2:
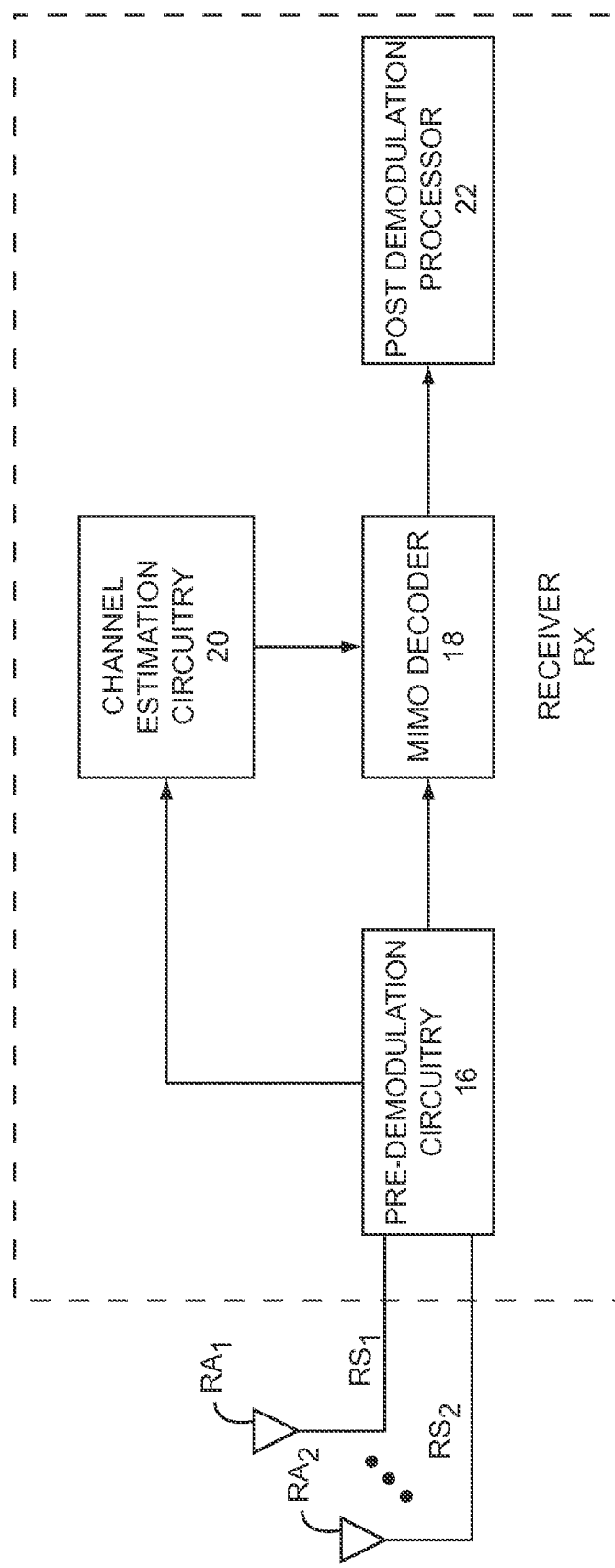
FIG. 2 is a block representation of a receiver according to one embodiment of the present invention.

With reference to FIG. 2, a basic architecture for a receiver RX is illustrated along with two receive antennas $RA_1$, $RA_2$. Those skilled in the art will recognize that the receiver RX may be associated with any number of receive antennas. The received signals $RS_1$, $RS_2$ are received at the receive antennas $RA_1$, $RA_2$, respectively, and processed by pre-demodulation circuitry 16 to recover received symbols for each of the received signals $RS_1$, $RS_2$ from the carriers or sub-carriers on which the symbols were originally modulated. For any given period, the pre-demodulation circuitry 16 will provide a received symbol for each of the received signals $RS_1$, $RS_2$. Each received symbol represents a composite of the multiple symbols that were transmitted from each of the transmit antennas $TA_1$, $TA_2$. The received symbols recovered from each of the received signals $RS_1$, $RS_2$ are provided to a MIMO decoder 18. Further, the pre-demodulation circuitry 16 also provides information to channel estimation circuitry 20, which determines transfer functions $h_{tr}$ for the corresponding channels between the transmit antennas $TA_1$, $TA_2$ and the receive antennas $RA_1$, $RA_2$.

Armed with the transfer functions $h_{tr}$ for the corresponding channels, the MIMO decoder 18 can generate the overall channel matrix H and its Moore-Penrose pseudo inverse $(H^{-1})$. If the received signal vector $\vec{r}$ is made up of the received symbols from the receive signals $RS_1$, $RS_2$, the MIMO decoder 18 can determine the transmitted data vector $\vec{t}$ by multiplying the Moore-Penrose pseudo inverse of channel matrix $(H^{-1})$ and the received signal vector $\vec{r}$, according to the above derived equation: $\vec{t} = H^{-1} \vec{r}$. Since the elements of the received signal vector $\vec{r}$ are received symbols, the transmitted data vector comprises the originally transmitted symbols $\vec{t}$, which were transmitted from each of the transmit antennas $TA_1$, $TA_2$.

The recovered symbols are demapped into corresponding bits based on the type of symbol level modulation used at the transmitters $TA_1$, $TA_2$. The symbol level modulation may correspond to quadrature phase shift keying (QPSK), any order of quadrature amplitude modulation (QAM) and any constellation based modulation. Importantly, the present invention supports the use of the same or different types of symbol level modulation by the different transmitters $TX_1$, $TX_2$ at the same time. For example, transmitter $TX_1$ may employ QPSK modulation, while transmitter $TX_2$ employs 16-QAM or 64-QAM modulation. As a further example, transmitter $TX_1$ may employ 16-QAM demodulation, while transmitter $TX_2$ employs 64-QAM modulation. Regardless of the symbol level modulation, the MIMO decoder 18 of the present invention is able to efficiently recover the respective symbols and demap the symbols into corresponding bits, as will be described in further detail below. The recovered bits are passed to the post demodulation processor 22 in association with the originating transmitters $TX_1$, $TX_2$ for further processing, as is traditional in the art.

Figure 3:
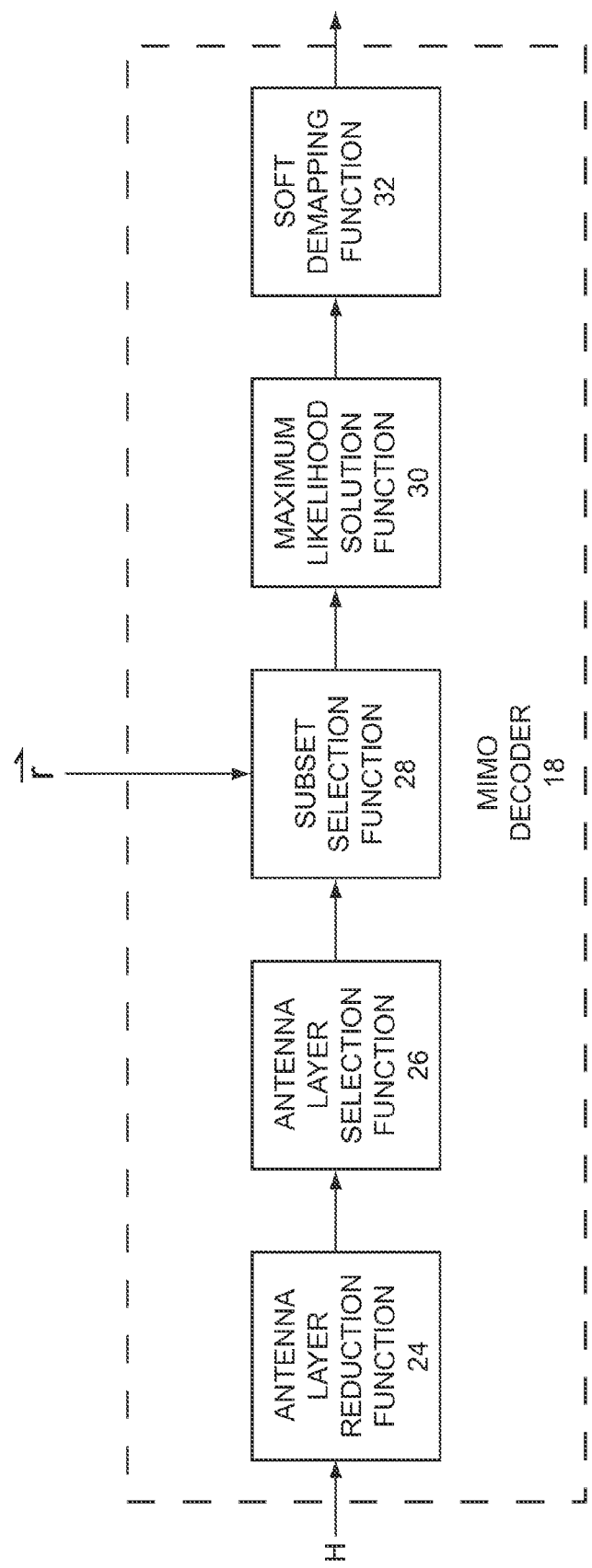
FIG. 3 is a block representation of a MIMO decoder according to one embodiment of the present invention.

An overview of the basic functional blocks of the MIMO decoder 18 is now provided according to one embodiment of the present invention. As illustrated in FIG. 3, the MIMO decoder 18 may include an antenna layer reduction function 24, antenna layer selection function 26, subset selection function 28, maximum likelihood solution function 30, and soft demapping function 32. Certain of these functions of the MIMO decoder 18 operate in relation to a concept referred to as antenna layers. From the above, all of the transmitted data streams $TD_n$ are present in each of the received signals $RS_m$. A given antenna layer is a logical representation of those portions of each of the received signals $RS_m$ that correspond to a single transmitted data stream $TD_n$. In other words, an antenna layer is effectively a cross section of each of the received signals $RS_m$ for a given transmitted data stream $TD_n$.

The antenna layer reduction function 24 and the antenna layer selection function 26 cooperate with one another in an iterative fashion. On the first iteration, the antenna layer selection function 26 will select an antenna layer, which is associated with the least inverse channel gain based on the overall channel matrix H, from all of the available antenna layers. Notably, the antenna layer associated with the least inverse channel gain directly corresponds to the antenna layer associated with the highest signal to inference and noise ratio (SINR). The antenna layer selection function 26 will also generate an inverse channel gain vector $\vec{g}_{min}$ for the selected antenna layer. The inverse channel gain vector $\vec{g}_{min}$ corresponds to the inverse of a vector corresponding to the channel transfer functions $h_{tr}$ for the selected antenna layer. As will be described further below, the subset selection function 28 will use the inverse channel gain vector $\vec{g}_{min}$ to generate an estimated transmit symbol $\tilde{s}$ for the first transmit layer by multiplying the inverse channel gain vector $\vec{g}_{min}$ with the received signal vector $\vec{r}$. The antenna layer reduction function 24 will proceed with a second iteration based on the selected antenna layer.

On the second iteration, the antenna layer reduction function 24 will remove the channel transfer functions $h_{tr}$ associated with the previously selected antenna layer from the overall channel matrix H to generate a reduced channel matrix H. In this example, reducing the overall channel matrix H effectively removes the column of channel transfer functions $h_{tr}$ that correspond to the previously selected antenna layer. From the remaining antenna layers, the antenna layer selection function 26 will then select another antenna layer that is associated with the least inverse channel gain based on the reduced channel matrix H. The antenna layer selection function 26 will also generate an inverse channel gain vector $\vec{g}_{min}$ for this newly selected antenna layer.

For subsequent iterations, the antenna reduction layer 24 will remove the channel transfer functions $h_{tr}$ for all of the previously selected antenna layers from the overall channel matrix H to generate an even further reduced channel matrix H. From the remaining antenna layers, the antenna layer selection function 26 will then select yet another antenna layer that is associated with the least inverse channel gain based on the reduced channel matrix H. The antenna layer selection function 26 will also generate an inverse channel gain vector $\vec{g}_{min}$ for this newly selected antenna layer. This iterative process will continue until each antenna layer has been addressed.

The subset selection function 28 also operates in an iterative fashion in conjunction with the antenna layer selection function 26 and the antenna layer reduction function 24. For the first iteration, the subset selection function 28 estimates the transmitted symbol for the selected antenna layer where, as indicated above, the estimated transmit symbol is referenced as $\tilde{s}$. The estimated transmit symbol $\tilde{s}$ may be determined by multiplying the inverse channel gain vector $\vec{g}_{min}$ for the selected layer by the received signal vector $\vec{r}$ as follows:

$$\tilde{s} = \vec{g}_{min} \vec{r}.$$

The inverse channel gain vector $\vec{g}_{min}$ for the selected layer corresponds to the inverse of a column of channel transfer functions $h_{tr}$, which represents a channel transfer function vector $\vec{h}$ for the selected antenna layer. Multiplying these vectors results in a single value for the estimated transmit symbol $\tilde{s}$. An estimated transmit symbol $\tilde{s}$ for a given layer is an initial approximation of a symbol that was originally transmitted from a corresponding one of the transmit antennas $TA_n$.

During the first iteration, the subset selection function 28 may access a constellation reference table, which provides all of the possible constellation points for the selected order of modulation. From the possible constellation points, the subset selection function 28 selects the four closest constellation points that are most proximate to the estimated transmit symbol $\tilde{s}$. The four closest constellation points that are selected represent candidate symbols and referenced as:

$$\hat{s}_1^{(1)}, \hat{s}_2^{(1)}, \hat{s}_3^{(1)}, \text{ and } \hat{s}_4^{(1)}.$$

These candidate symbols $\hat{s}_1^{(1)}$, $\hat{s}_2^{(1)}$, $\hat{s}_3^{(1)}$, and $\hat{s}_4^{(1)}$ are the four reference symbols deemed most likely to correspond to the symbol originally transmitted in the first selected antenna layer. Notably, for QPSK modulation, there are only four possible constellation points. As such, all of the possible constellation points are candidate symbols.

For the second iteration, the interference contribution of the first selected antenna layer, which was selected during the first iteration, is effectively subtracted from the received signal vector $\vec{r}$. Theoretically, the interference contribution of the first selected antenna layer can be estimated by multiplying the channel transfer function vector $\vec{h}$ (column of channel transfer functions) for the first selected antenna layer and the actually transmitted symbol s as follows:

$$\text{interference contribution} = \vec{h} s.$$

Unfortunately, only the estimated transmit symbol $\tilde{s}$ and the candidate symbols $\hat{s}$, which were selected based on the estimated transmit symbol $\tilde{s}$, are known at this time. Accordingly, the interference contributions for each of the candidate symbols $\hat{s}$ of the first selected layer are estimated by multiplying the channel transfer function vector $\vec{h}$ for the first selected antenna layer and a corresponding candidate symbol $\hat{s}$ as follows:

$$\text{interference contribution} = \vec{h} \hat{s}.$$

As a result, reduced received signal vectors $\vec{r}$ for the second iteration are calculated for each of the candidate symbols $\hat{s}$ identified for the first selected antenna layer as follows:

$$\vec{r}^{(2)} = \vec{r}^{(1)} - \vec{h} \hat{s},$$

where $\vec{r}^{(2)}$ is the received signal vector for the second iteration, and $\vec{r}^{(1)}$ is the received signal vector for the first iteration. In particular, since there are four candidate symbols, there will be four corresponding reduced received signal vectors $\vec{r}^{(2)}$ for the second iteration as follows:

$$\vec{r}_1^{(2)} = \vec{r}^{(1)} - \vec{h} \hat{s}_1^{(1)};$$

$$\vec{r}_2^{(2)} = \vec{r}^{(1)} - \vec{h} \hat{s}_2^{(1)};$$

$$\vec{r}_3^{(2)} = \vec{r}^{(1)} - \vec{h} \hat{s}_3^{(1)}; \text{ and}$$

$$\vec{r}_4^{(2)} = \vec{r}^{(1)} - \vec{h} \hat{s}_4^{(1)}.$$

For the second iteration, the subset selection function 28 estimates four transmitted symbols for the second selected antenna layer using each of the reduced received signal vectors $\vec{r}^{(2)}$. This is accomplished by multiplying the inverse channel gain vector $\vec{g}_{min}$ for the second selected layer by the each of the reduced received signal vectors $\vec{r}^{(2)}$ as follows:

$$\tilde{s}_1^{(2)} = \vec{g}_{min} \vec{r}_1^{(2)};$$

$$\tilde{s}_2^{(2)} = \vec{g}_{min} \vec{r}_2^{(2)};$$

$$\tilde{s}_3^{(2)} = \vec{g}_{min} \vec{r}_3^{(2)}; \text{ and}$$

$$\tilde{s}_4^{(2)} = \vec{g}_{min} \vec{r}_4^{(2)};$$

Again, the inverse channel gain vector $\vec{g}_{min}$ for the selected layer corresponds to the inverse of a column of channel transfer functions $h_{tr}$, which represents a channel transfer function vector $\vec{h}$ for the second selected antenna layer.

During the second iteration, the subset selection function 28 will again access the constellation reference table, which provides all of the possible constellation points for the selected order of modulation. From the possible constellation points, the subset selection function 28 selects the four closest constellation points that are most proximate to the each of the four estimated transmit symbols $\tilde{s}_1^{(2)}$; $\tilde{s}_2^{(2)}$; $\tilde{s}_3^{(2)}$; and $\tilde{s}_4^{(2)}$. As a result, there will be 16 candidate symbols, which are represented by:

$\hat{s}_{j,1}^{(2)}$, $\hat{s}_{j,2}^{(2)}$, $\hat{s}_{j,3}^{(2)}$, and $\hat{s}_{j,4}^{(2)}$, where j=1 to 4 and corresponds to one of the estimated transit symbols $\tilde{s}_j^{(2)}$ for the second iteration and second selected antenna layer.

This iterative process is provided for each of the available antenna layers. Assuming there are only two antenna layers, the subset selection function 28 will generate and provide four candidate symbols ($\hat{s}_1^{(1)}, \hat{s}_2^{(1)}, \hat{s}_3^{(1)},$ and $\hat{s}_4^{(1)}$) for the first selected antenna layer along with the sixteen candidate symbols ($\hat{s}_{j,1}^{(2)}, \hat{s}_{j,2}^{(2)}, \hat{s}_{j,3}^{(2)},$ and $\hat{s}_{j,4}^{(2)}$ where j=1 to 4) for the second selected antenna layer to the maximum likelihood solution function 30.

Given the nature of the layering, each of the candidate symbols from the first selected antenna layer is associated with a unique set of four candidate symbols from the second selected antenna layer for a two-layer scenario. This association produces sixteen possible symbol pairs, where a symbol pair is made up of one candidate symbol from the first selected antenna layer and one symbol candidate from the second selected antenna layer. As a result, the maximum likelihood decoder solution function processes each of the sixteen pairs of candidate symbols and selects the pair that is most likely to correspond to the pair of symbols originally transmitted from the two transmit antennas $TA_1$, $TA_2$. In general, the maximum likelihood solution function 30 compares each pair of candidate symbols to the received signal vector $\vec{r}$ and determines which one of the candidate pairs most closely matches the received signal vector $\vec{r}$. The candidate pair that most closely matches the received signal vector $\vec{r}$ is selected as the pair of symbols transmitted from the respective transmit antennas $TA_1$, $TA_2$ and is referred to as the maximum likelihood solution (MLS). The MLS is a vector of symbols corresponding to the candidate pair, or group if three or more antenna layers are present, and is represented by $\tilde{s}_{MLS}$. The MLS vector $\tilde{s}_{MLS}$ is provided to the soft demapping function 32. Since the antenna layer having the highest SINR may not have been the first antenna layer, the symbols in the MLS vector $\tilde{s}_{MLS}$ may be reordered as necessary to place them in an order in which actual antenna layers are referenced. As such, the soft demapping function 32 is able to associate the symbols in the MLS vector $\tilde{s}_{MLS}$ with the corresponding antenna layer.

Each symbol in the MLS vector $\tilde{s}_{MLS}$ is associated with a number of bits, depending on the type and order of the modulation. For example, each QPSK symbol represents two bits, each 16-QAM symbol represents four bits, and each 64-QAM symbol represents six bits. As noted, the different antenna layers may support different orders or types of modulation at the same time. The soft demapping function 32 receives the MLS vector $\vec{s}_{MLS}$ and processes each bit of each symbol in MLS vector $\vec{s}_{MLS}$. For each bit, the soft demapping function 32 determines the relative likelihood of the bit being either a logic 0 or logic 1. In particular, the soft demapping function 32 calculates a log likelihood ratio (LLR) for each of these bits based on the channel matrix H and MLS vector $\vec{s}_{MLS}$. The LLR for a given bit is the relative measure of the likelihood that the bit is either a logic 0 or logic 1, which may correspond to an actual 0 and 1 or −1 and 1, respectively. The LLRs for the bits provide the output of the MIMO decoder 18 and are used to recover the originally transmitted bits, which are processed as desired by the post demodulation processor 22.

From the above, the various functions in the MIMO decoder 18 must carry out many computationally intensive mathematical operations, including matrix multiplication, inversion, division, and like manipulation. In particular, the antenna layer selection function 26 and the soft demapping function 32 often require significant matrix manipulations. To compound these issues, the iterative processing nature of these functions has a potential to exponentially increase the number of computations for any given iteration. Different embodiments of the present invention significantly reduce the computational intensity associated with carrying out the functions of the antenna layer selection function 26 and the soft demapping function 32. These embodiments may be used alone or in conjunction in the MIMO decoder 18. A detailed description of a computationally efficient antenna layer selection function 26 is followed by a computationally efficient soft demapping function 32, according to different embodiments of the present invention.

Figure 4:
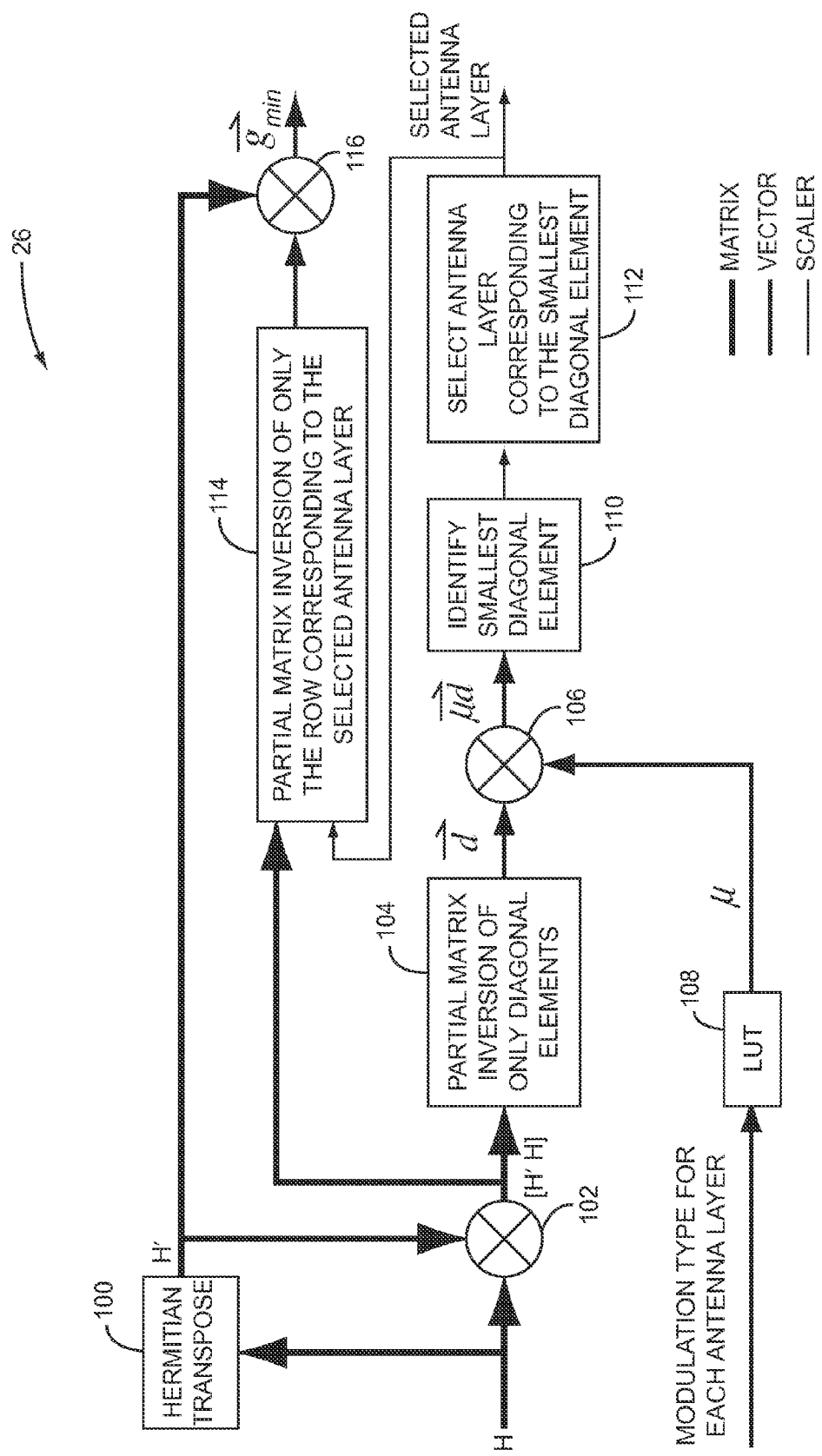
FIG. 4 is a logical flow diagram illustrating operation of an antenna layer selection function according to one embodiment of the present invention.

With reference to FIG. 4, a functional block diagram is provided for an antenna layer selection function 26, according to one embodiment of the present invention. As noted above, the objective of the antenna layer selection function 26 is to analyze the channel matrix H and select an antenna layer having the minimum inverse channel gain (or highest SINR) and generate an inverse channel gain vector $\vec{g}_{min}$ for the selected layer. This process is provided in an iterative manner, wherein a different antenna layer is selected for each iteration. Further, the channel matrix H is reduced for each successive iteration by removing the channel transfer functions $h_{tr}$ for the previously selected antenna layers, as described above.

With continued reference to FIG. 4, the illustrated operations are provided during a single iteration, which is operating on an overall or reduced channel matrix H. This iterative process is provided for each carrier or sub-carrier. Once the overall or reduced channel matrix H is available, the antenna layer selection function 26 will generate the Hermitian transpose of the channel matrix H to generate a transposed channel matrix H' (block 100). The channel matrix H is then multiplied by the transposed channel matrix H' to generate a product matrix [H'H] (block 102). At this point in traditional antenna layer selection operations, a complete matrix inversion is provided for the product matrix [H'H]. Such operation is extremely computationally intensive.

In one embodiment of the present invention, only a partial matrix inversion of the diagonal elements of the product matrix is provided, wherein the diagonal elements of the partially inverted matrix form a vector, which is referred to as a diagonal vector, referenced as $\vec{d}$ (block 104). The elements of the diagonal vector generally correspond to the inverse channel gain for the respective antenna layers. The diagonal vector $\vec{d}$ may be modified by one or more normalization factors μ (block 106). These normalization factors are provided from a look-up table (LUT) (block 108), and correspond to the type of modulation being employed by each of the layers represented in the channel matrix H. Notably, different types of modulation, such as QPSK, QAM, 16-QAM, and the like, are associated with different modulation gains. These different gains have a direct impact on the channel transfer functions $h_{tr}$ in the channel matrix H. The resulting impact generally leads to certain types of modulations always having apparently lower or higher inverse channel gains or SINRs relative to other types of modulation. Accordingly, the antenna layer selection function 26 will effectively normalize the impact of the different types of modulation used in the different antenna layers using gain normalization factors μ.

Each antenna layer may be compensated with a different gain normalization factor μ. In particular, different gain normalization factors may be used to multiply the different diagonal elements in the diagonal vector $\vec{d}$ based on the type of modulation being employed at each antenna layer. Accordingly, if there are three antenna layers represented in the channel matrix H, each antenna layer may employ a different type of modulation and may be compensated with different gain normalization factors μ. Once the elements in the diagonal vector $\vec{d}$ are multiplied by any appropriate gain normalization factors μ, a normalized diagonal vector $\mu\vec{d}$ is created. The normalized diagonal vector $\mu\vec{d}$ is then processed to identify the smallest diagonal element in the normalized diagonal vector $\mu\vec{d}$ (block 110). Next, the antenna layer selection function 26 will select the antenna layer corresponding to the smallest diagonal element in the diagonal vector $\mu\vec{d}$ as the selected antenna layer for the iteration (block 112). Again, the selected antenna layer is the one antenna layer that is associated with the least inverse channel gain or maximum SINR. At this point, the product matrix [H'H] is processed such that a partial matrix inversion of the product matrix along the row that corresponds to the selected antenna layer is computed (block 114). The computed row, which is a vector, is then multiplied by the Hermitian transposed channel matrix H' to generate the inverse channel gain vector $\vec{g}_{min}$ for the selected antenna layer (block 116).

Figure 6:
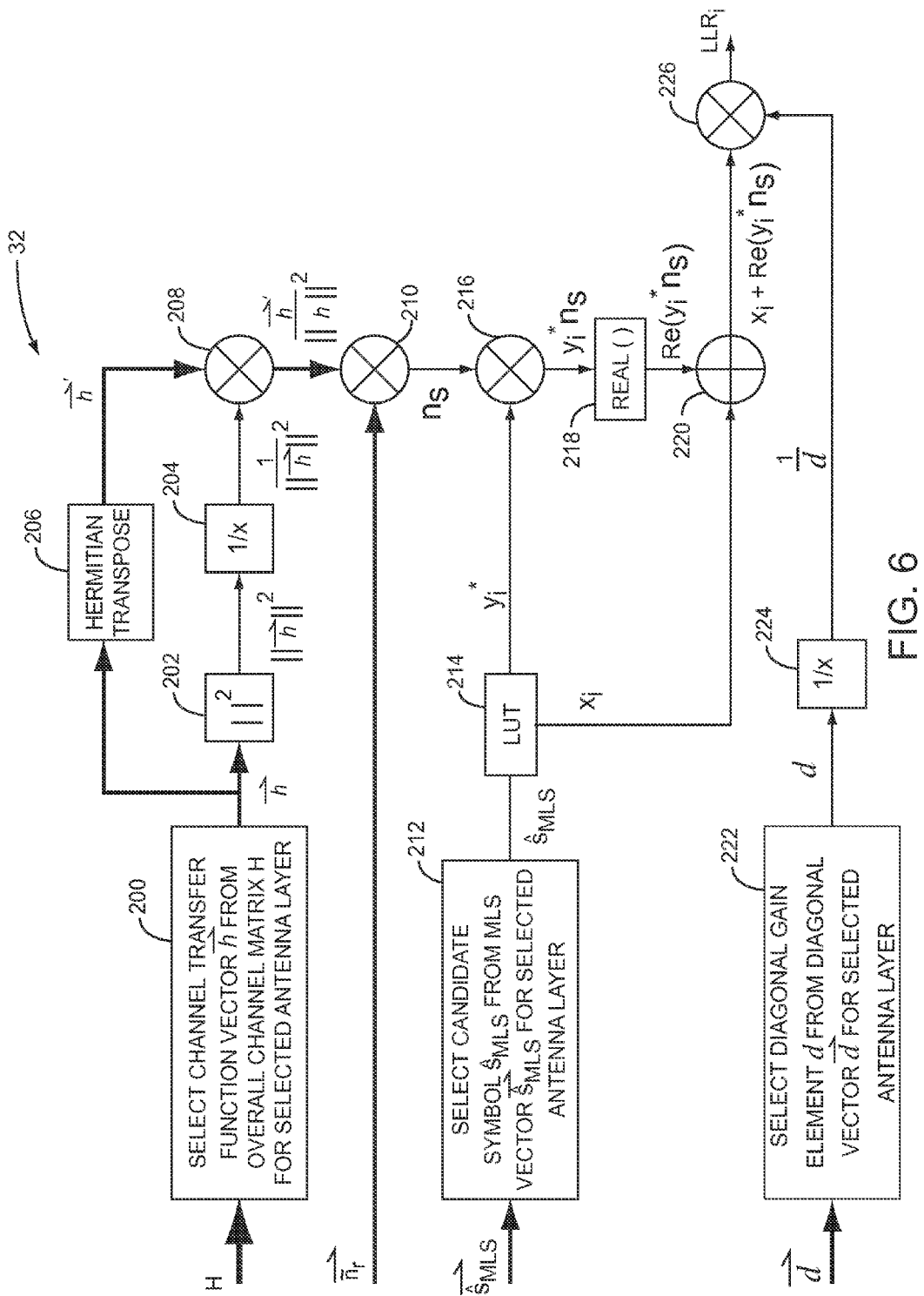
FIG. 6 is a logical flow diagram illustrating operation of a first embodiment of a soft demapping function according to one embodiment of the present invention.

With reference to FIG. 6, a soft demapping process is provided for an n×m MIMO system, according to one embodiment of the present invention. To facilitate the process, the soft demapping function 32 will receive as inputs: the overall channel matrix H, the MLS vector $\vec{s}_{MLS}$, the diagonal vector $\vec{d}$ (or other like function of SINR or inverse channel gain), and a residual noise vector $\tilde{n}_r$. The overall channel matrix H is an input to the MIMO decoder 18 from the channel estimation circuitry 20. The MLS vector $\vec{s}_{MLS}$ is provided from the maximum likelihood solution function 30. The diagonal vector $\vec{d}$ is effectively the output of the partial matrix inversion provided by block 104 of the antenna layer selection function 26 illustrated in FIG. 4.

The residual noise vector $\tilde{n}_r$ corresponds to removing the influence of the MLS vector $\vec{s}_{MLS}$ from the received signal vector $\vec{r}$, and is calculated as follows:

$$\tilde{n}_r = \vec{r} - H\vec{s}_{MLS}.$$

where $\vec{r}$ represents the received signal vector, H represents the overall channel matrix, and $\vec{s}_{MLS}$ represents the maximum likelihood solution vector. The soft demapping function 32 provides an LLR for each bit that is represented by each candidate symbol $\hat{s}_{MLS}$ in the MLS vector $\vec{s}_{MLS}$. Different levels of modulation will be associated with a different number of bits, and thus corresponding LLRs. In one embodiment of the present invention, the LLR is calculated as follows:

$$LLR_i = [x_i + \text{Re}(y_i^* n_s)]\frac{1}{d},$$

where $LLR_i$ represents the LLR for the $i^{th}$ bit for any given candidate symbol $\hat{s}_{MLS}$ within the MLS vector $\vec{s}_{MLS}$. d is the element within the diagonal vector $\vec{d}$ (or other like measure of SINR or inverse channel gain), and $n_s$ is a decorrelator value, which is defined further below. The values for $x_i$ and $y_i$ relate to the distance between the candidate symbol $\hat{s}_{MLS}$ for the bit being processed, and the closest competitor symbol $c_i$. As will be described further below, the values for $x_i$ and $y_i$ are pre-computed and stored in a look-up table, which is accessible by the soft demapping function 32. By pre-computing these distance related values for $x_i$ and $y_i$, the computational intensity that is normally required by the soft demapping function 32 is significantly reduced.

The decorrelator value $n_s$ represents the residual noise in the normalized constellation plane, and may be calculated as follows:

$$n_s = \frac{\vec{h}'}{\|\vec{h}\|^2}\tilde{n}_r$$

where $\tilde{n}_r$ represents the residual noise vector, $\vec{h}'$ represents the Hermitian transpose of the channel transfer function $\vec{h}$ for the selected antenna layer, and $\|\vec{h}\|^2$ represents the squared norm value of the channel transfer function $\vec{h}$ for the selected antenna layer. This technique for calculating the LLR for each bit of each candidate symbol $\hat{s}_{MLS}$ of the MLS vector $\vec{s}_{MLS}$ is unique to one embodiment of the present invention, and represents a significantly improved and very efficient technique for calculating the LLRs.

Figure 5:
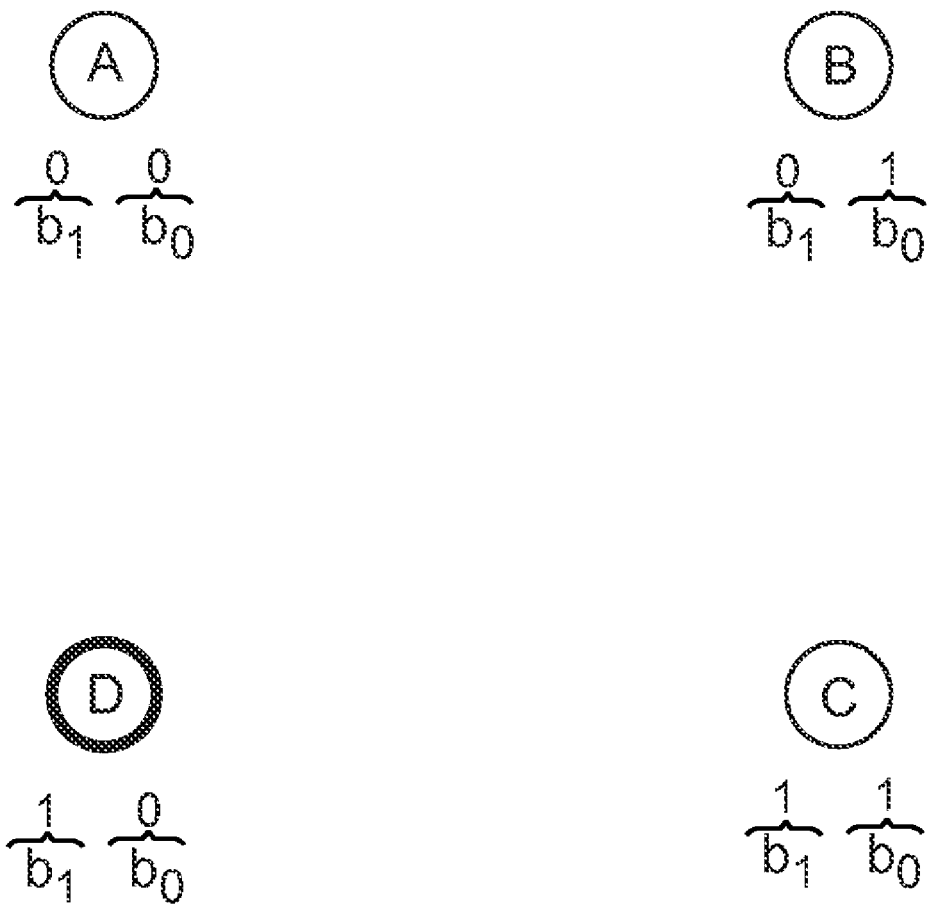
FIG. 5 illustrates a quadrature phase shift keying (QPSK) symbol constellation according to one embodiment of the present invention.

Prior to providing an example of how these equations may be implemented by the soft demapping function 32, an overview of how the LUT is populated with the appropriate values for x and y is provided. With reference to FIG. 5, a constellation for a QPSK constellation is illustrated. The constellation includes four constellation points: A, B, C, and D. Each constellation point corresponds to a potential symbol in the QPSK constellation, and each symbol represents one of two bits, $b_0$ and $b_1$. One of the goals of the soft demapping function 32 is to identify the closest competitor symbol for each bit $b_i$. For the illustrated QPSK example, the closest competitor symbol for the candidate symbol $\hat{s}_{MLS}$ is determined for both bit $b_1$ and $b_0$. In this example, assume the candidate symbol $\hat{s}_{MLS}$ corresponds to symbol D in the QPSK constellation. For symbol D, $b_1=1$ and $b_0=0$. Initially, the symbols in the constellation that are competing with $b_1$ are symbols A and B. This is because symbols A and B correspond to bit $b_1=0$. Symbol C does not compete with bit $b_1$ of symbol D, because bit $b_1$ of symbol C is equal to 1. Since bit $b_1=0$ for both symbol A and symbol B, these symbols are considered to be competing symbols. Next, the closest competing symbol to symbol D is determined. Based on proximity, symbol A is closest to symbol D, and as such, symbol A is determined to be the closest competing symbol for bit $b_1$ of symbol D.

The process is then repeated for bit $b_0$ of symbol D. Since bit $b_0=0$ for symbol D, symbols B and C are competing symbols, because bit $b_0=1$ for symbols B and C. Of symbols B and C, symbol C is closest to symbol D, and as such, symbol C is selected as the closest competing symbol for bit $b_0$ of symbol D. An x value and a y value are calculated based on these respective competing symbols A and C.

In one embodiment, each bit $b_i$ that has a value of either 0 or 1 can be mapped into a value $B_i$ that has a value of either +1 or −1. Accordingly, the following mapping scenarios are possible, depending on whether or not the bits are effectively inverted. Implementation of inversion may be based on any forward error correction that is done in the post demodulation processor 22 during subsequent processing. The first mapping scenario is provided as follows:

$b_i=0$ to $B_i=-1$ and $b_i=1$ to $B_i=+1$.

An alternative mapping equation is provided as follows:

$b_i=0$ to $B_i=+1$ and $b_i=1$ to $B_i=-1$.

From the above, values of $x_i$ and $y_i$ are pre-computed as follows for each possible scenario:

$x_i = B_i|\hat{s}_{MLS} - \hat{c}_i|^2$ $y_i = 2 B_i(\hat{s}_{MLS} - \hat{c}_i)$ wherein $\hat{s}_{MLS}$ is the candidate symbol, and $c_i$ is the closest competing symbol for the $i^{th}$ bit.

Notably, each type of modulation may require its own table. For example, if a system supports QPSK, 16-QAM, and 64-QAM, a different table may be provided for each of the three types of modulation. For QPSK modulation, each bit of each potential symbol will likely be associated with 2 ($x_i$, $y_i$) value sets. Since each bit may take one of two values, each value will be associated with a (x, y) value set. In the previous example, where the candidate symbol $\hat{s}_{MLS}$ corresponds to symbol D in the QPSK modulation, $b_1=1$ will provide 1(x, y) value set; however, if $b_1=0$, a different (x, y) value set would be provided. The same is true for $b_0$ of symbol D. Further, each of the other symbols A, B, and C are addressed in a similar fashion. During processing, the soft demapping function 32 need only identify the candidate symbol and select an appropriate (x, y) value set for each bit, depending on the value of the bit, from the LUT, instead of having to calculate the respective ($x_i$, $y_i$) value sets on the fly.

With continued reference to FIG. 6, a process is provided for generating the LLR for a particular bit in a candidate symbol $\hat{s}_{MLS}$. Initially, the soft demapping function 32 will access the overall channel matrix H and select the channel transfer function vector $\vec{h}$ from the overall channel matrix H for the selected antenna layer (block 200). The norm of the channel transfer function vector $\vec{h}$ is generated and then squared (block 202). The result is then inverted (block 204), and multiplied by the Hermitian transpose of the channel transfer function vector $\vec{h}$ (blocks 206 and 208). The result of this multiplication is further multiplied by the residual noise vector $\tilde{n}_r$ to generate the decorrelator value $n_s$ (block 210).

During this time, the soft demapping function 32 will also select the candidate symbol $\hat{s}_{MLS}$ from the MLS vector $\vec{s}_{MLS}$ for the selected antenna layer (block 212). The selected candidate symbol $\hat{s}_{MLS}$ is used by the LUT to generate corresponding ($x_i$, $y_i$) value sets for each bit of the candidate symbol $\hat{s}_{MLS}$ (block 214). The conjugate of $y_i$ is multiplied by the decorrelator value $n_s$ (block 216), and the real part of the product (block 218) is added to $x_i$ (block 220).

Meanwhile, the soft demapping function 32 will select the diagonal element d from the inverse channel gain vector $\vec{d}$ for the selected antenna layer (block 222). The diagonal element d is inverted (block 224) and multiplied (block 226) by the output of block 220 ($x_i$+Re($y_i^* n_s$)) to generate the $LLR_i$ for the i$^{th}$ bit in the candidate symbol $\hat{s}_{MLS}$. Notably, the decorrelator value $n_s$ and the inverse channel gain element d will not change for each of the bits of the candidate symbol $\hat{s}_{MLS}$. As such, the LUT will provide the appropriate $x_i$ and $y_i$ (or $y_i^*$) such that an LLR is generated for each bit of the candidate symbol $\hat{s}_{MLS}$.

Again, the above process is particularly pertinent for n×m MIMO systems where there are n transmit antennas $TA_n$ and m receive antennas $RA_m$. The process may be further simplified for 2×m MIMO systems where there are two transmit antennas $TA_n$ (n=2) and m receive antennas $RA_m$. In a 2×m MIMO system, there are only two antenna layers, because there are only two transmit antennas $TA_n$. In one embodiment of the invention, the LLR for a 2×m system for each bit of each candidate symbol $\hat{s}_{MLS}$ is calculated as follows:

$$LLR_i = \frac{\Delta}{\|\vec{h}_1\|^2 \|\vec{h}_2\|^2}\left(x_i\|\vec{h}\|^2 + \text{Re}\left(y_i^* \vec{h}' \vec{n}_r\right)\right)$$

where $\vec{h}_1$ is a first of two channel transfer functions, $\vec{h}_2$ is a second of the two channel transfer functions, and $\vec{n}_r$ is the residual noise vector. $x_i$ and $y_i$ are provided by a look-up table as described above. The $\Delta$ represents a determinant of $[H'H]^{-1}$, where H' is the Hermitian transpose of the overall channel matrix H.

Figure 7:
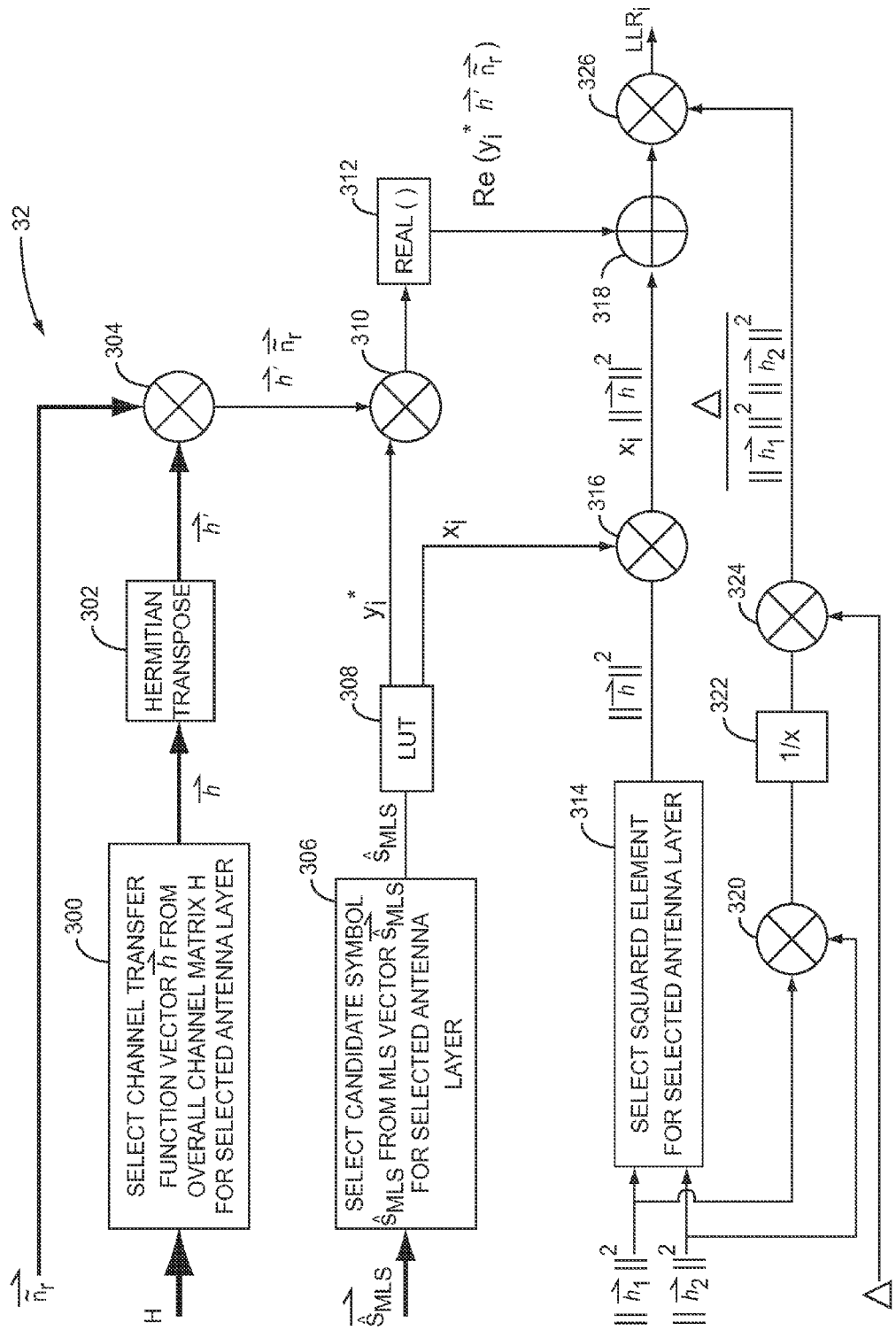
FIG. 7 is a logical flow diagram illustrating operation of a second embodiment of a soft demapping function according to one embodiment of the present invention.

With reference to FIG. 7, an exemplary process for calculating $LLR_i$ for the i$^{th}$ bit of a candidate symbol $\hat{s}_{MLS}$ for an MLS vector $\vec{s}_{MLS}$ is illustrated. The process follows the preceding equation. Initially, the soft demapping function 32 will select the channel transfer function vector $\vec{h}$ from the overall channel matrix H for the selected antenna layer (block 300). The Hermitian transpose of the channel transfer function $\vec{h}$ (block 302) is multiplied by the residual noise vector $\vec{n}_r$ (block 304).

Meanwhile, the soft demapping function 32 will select a candidate symbol $\hat{s}_{MLS}$ from the MLS vector $\vec{s}_{MLS}$ for the selected antenna layer (block 306). The candidate symbol $\hat{s}_{MLS}$ is used by the LUT to select the ($x_i$, $y_i$) value sets for each bit of the candidate symbol $\hat{s}_{MLS}$ in sequence (block 308). The product of the Hermitian transpose of the channel transfer function vector $\vec{h}$ and the residual noise vector $\vec{n}_r$ is multiplied by the conjugate of $y_i$ (block 310), and the real part of the resultant product is taken for further processing (block 312).

To facilitate the process, the soft demapping function 32 will take as inputs two squared elements, $\|\vec{h}_1\|^2$ and $\|\vec{h}_2\|^2$, corresponding to the squared norm of the two channel transfer function vectors $\vec{h}_1$ and $\vec{h}_2$ respectively. The soft demapping function 32 will select $\|\vec{h}\|^2$ from these two squared elements for the selected antenna layer (block 314) and then multiplied by $x_i$ (block 316). The resulting product ($x_i\|\vec{h}\|^2$) is added to the real part of $y_i^* \vec{h}' \vec{n}_r$ (block 318).

In parallel, the squared elements for each antenna layer, $\|\vec{h}_1\|^2$ and $\|\vec{h}_2\|^2$, are multiplied (block 320) and the resulting product is inverted (block 322). The inverted result is multiplied by the aforementioned determinant (block 324) to provide the following:

$$\frac{\Delta}{\|\vec{h}_1\|^2 \|\vec{h}_2\|^2}$$

The outputs of blocks 318 and 324 are multiplied to generate the $LLR_i$ for the i$^{th}$ bit of the candidate symbol $\hat{s}_{MLS}$ (block 326). As noted above, the LUT will sequentially step through the ($x_i$, $y_i$) value sets for each of the bits in the candidate symbol $\hat{s}_{MLS}$ to generate each of the respective LLRs.

The terms "transmitter," "transmit," "receiver," and "receive" are used only with reference to a given direction for communication link. The respective antennas may act as both receive and transmit antennas depending on the relative direction of communications. Accordingly, the concepts of the present invention may be employed in any type of wireless node, such as a fixed or mobile user element, base station, access point, or the like.

In the above description and the following claims, the terms "row" and "column" are relative terms and may be used interchangeably with respect to one another to identify those elements associated with one another in different dimensions. As such, the column of a matrix may refer to the horizontal elements in the matrix, while the row of a matrix may refer to the vertical elements in the matrix, and vice versa.

Those skilled in the art will recognize improvements and modifications to the preferred embodiments of the present invention. All such improvements and modifications are considered within the scope of the concepts disclosed herein and the claims that follow.

The invention claimed is:

1. A method comprising:
   providing a look-up table that comprises distance information corresponding to a distance between a potential candidate symbol and a most proximate competing symbol for each bit of a plurality of potential candidate symbols;
   receiving a plurality of candidate symbols that are provided in a maximum likelihood solution and correspond to a plurality of antenna layers of a multiple input multiple output (MIMO) wireless communication system;
   selecting a first candidate symbol from the plurality, of candidate symbols, wherein the first candidate symbol corresponds to a first potential candidate symbol of the plurality of candidate symbols;
   obtaining the distance information for each bit of the first potential candidate symbol from the look-up table;
   determining likelihood indicium for each bit of the first candidate symbol as a function of the distance information for each bit of the first potential candidate symbol, wherein the likelihood indicium for a given bit is indicative of a likelihood that a value for the given bit is a logic 1 or a logic 0;
   determining a product of a maximum likelihood solution vector comprising the plurality of candidate signals and an overall channel matrix; and
   subtracting the product from the received signal vector to determine a residual noise vector, wherein the likelihood indicium for each bit is a further function of the residual noise vector.

2. The method of claim 1 wherein the likelihood indicium for each bit is a further function of a plurality of channel transfer elements for a first antenna layer of the plurality of antenna layers in which the first candidate symbol was received.

3. The method of claim 2 further comprising:
obtaining a received signal vector representative of signals received at a plurality of antennas.

4. The method of claim 3 further comprising generating a decorrelation value $n_x$ based on $$n_s = \frac{\vec{h}'}{\|\vec{h}\|^2} \vec{n}_r,$$

where $\vec{n}_r$ represents the residual noise, vector, $\vec{h}'$ represents a Hermitian transpose of a channel transfer function vector $\vec{h}$ comprising the plurality of channel transfer elements for the first antenna layer, and $\|\vec{h}\|^2$ represents a squared norm value of the channel transfer function vector $\vec{h}$ for the first antenna layer.

5. The method of claim 1 wherein the likelihood indicium for each bit is determined based on $[x+\text{Re}(y^*n_x)]1/d$, where x and y are distance information for each bit, $n_x$ represents a decorrelation value, Re(complex number) represents a real part of the complex number, and d is indicative of inverse channel gain.

6. The method of claim 5 further comprising generating the decorrelation value $n_x$ based on $$n_s = \frac{\vec{h}'}{\|\vec{h}\|^2} \vec{n}_r,$$

where $\vec{n}_r$ represents a residual noise vector, $\vec{h}'$ represents a Hermitian transpose of a channel transfer function vector $\vec{h}$ comprising the plurality of channel transfer elements for the first antenna layer, and $\|\vec{h}\|^2$ represents a squared norm value of the channel transfer function vector $\vec{h}$ for the first antenna layer.

7. The method of claim 5 further comprising:
obtaining a channel matrix comprising channel transfer elements corresponding to different channels in the MIMO wireless communication system, wherein each column of channel transfer elements of the channel matrix corresponds to one antenna layer of the plurality of antenna layers, each of the plurality of antenna layers associated with a transmitted data stream that was transmitted from a transmit antenna;
generating a Hermitian transpose of the channel matrix;
generating a product of the Hermitian transpose of the channel matrix and the channel matrix to provide a first product having a plurality of diagonal elements; and
generating a partial matrix inversion for the plurality of diagonal elements of the first product to provide a diagonal vector, wherein d is a function of the diagonal vector.

8. A method comprising:
providing a look-up table that comprises distance information corresponding to a distance between a potential candidate symbol and a most proximate competing symbol for each bit of a plurality of potential candidate symbols;
receiving a plurality of candidate symbols that are provided a maximum likelihood solution and correspond to a plurality of antenna layers of a multiple input multiple output (MIMO) wireless communication system;
selecting a first candidate symbol from the plurality of candidate symbols, wherein the first candidate symbol corresponds to a first potential candidate symbol of the plurality of candidate symbols;
obtaining the distance information for each bit of the first potential candidate symbol from the look-up table; and
determining likelihood indicium for each bit of the first candidate symbol as a function of the distance information for each bit of the first potential candidate symbol, wherein the likelihood indicium for a given bit is indicative of a likelihood that a value for the given bit is a logic 1 or a logic 0,
wherein symbols transmitted in a first data stream corresponding to a first of the plurality of antenna layers are modulated using a first type of modulation, symbols transmitted in a second data stream corresponding to a second of the plurality of antenna layers are modulated using a second type of modulation, which is different than the first type of modulation, and the look-up table comprises distance information corresponding to the distance between the potential candidate symbol and the most proximate competing symbol for each bit of a plurality potential candidate symbols for both the first type of modulation and the second type of modulation.

9. The method of claim 8 wherein the first type of modulation and the second type of modulation are selected from a group consisting of quadrature phase shift keying modulation, $n^{th}$ order quadrature amplitude modulation where n is an integer and any constellation based modulation.

10. The method of claim 1 further comprising:
selecting a second candidate symbol from the plurality of candidate symbols, wherein the second candidate symbol corresponds to a second potential candidate symbol of the plurality of candidate symbols;
obtaining the distance information for each bit of the second potential candidate symbol from the look-up table; and
determining likelihood indicium for each bit of the second candidate symbol as a function of the distance information for each bit of the second potential candidate symbol, wherein the likelihood indicium for a given bit is indicative of a likelihood that a value for the given bit is a logic 1 or a logic 0.

11. The method of claim 10 wherein the first candidate symbol corresponds to a different type of modulation than the second candidate symbol.

12. The method of claim 11 wherein transmitted symbols corresponding to the first candidate symbol and the second candidate symbol are substantially simultaneously transmitted from different antennas using a common wireless resource.

13. The method of claim 1 wherein there are two antenna layers, aid the likelihood indicium for each bit is determined based on $$\frac{\Delta}{\|\vec{h}_1\|^2 \|h_2\|^2} \left( x \|\vec{h}_j\|^2 + \text{Re}\left( y^* \vec{h}'_j \vec{n}_r \right) \right),$$

where j corresponds to $j^{th}$ antenna layer for the first candidate symbol being processed, $\vec{h}_1$ is a first of two channel transfer function vectors $\vec{h}$, $\vec{h}_2$ is a second of the two channel transfer functions vectors, $\vec{h}_j$ is the channel transfer function vector for the $j^{th}$ antenna layer, $\vec{h}_j'$ is the Hermitian transpose of $\vec{h}_j$, $\|\vec{h}\|^2$ represents a squared norm value of the channel transfer function vector $\vec{h}_j$, $\vec{\tilde{n}}_r$ is a residual noise vector, x and y are distance information for each bit of the first candidate symbol, Re(complex number) represents a real part of the complex number, and $\Delta$ represents a determinant of $[H'H]^{-1}$, where H' is the Hermitian transpose of the overall channel matrix H.

14. A multiple input multiple output (MIMO) decoding system comprising:
  a look-up table comprising distance information corresponding to a distance between a potential candidate symbol and a most proximate competing symbol for each bit of a plurality of potential candidate symbols; and
  a MIMO decoder configured to:
    receive a plurality of candidate symbols that are provided in a maximum likelihood solution and correspond to a plurality of antenna layers of a MIMO wireless communication system;
    select a first candidate symbol from the plurality of candidate symbols, wherein the first candidate symbol corresponds to a first potential candidate symbol of the plurality of candidate symbols;
    obtain the distance information for each bit of the first potential candidate symbol from the look-up table;
    determine likelihood indicium for each bit of the first candidate symbol as a function of the distance information for each bit of the first potential candidate symbol, wherein the likelihood indicium for a given bit is indicative of a likelihood that a value for the given bit is a logic 1 or a logic 0;
    determine a product of a maximum likelihood solution vector comprising the plurality of candidate signals and an overall channel matrix; and
    subtract the product from the received signal vector to determine a residual noise vector, wherein the likelihood indicium for each bit is a further function of the residual noise vector.

15. The MIMO decoding system of claim 14 wherein the likelihood indicium for each bit is a further function of a plurality of channel transfer elements for a first antenna layer of the plurality of antenna layers in which the first candidate symbol was received.

16. The MIMO decoding system of claim 15 wherein the MIMO decoder is further adapted to:
  obtain a received signal vector representative of signals received at a plurality of antennas.

17. The MIMO decoding system of claim 16 wherein the MIMO decoder is further adapted to generate a decorrelation value $n_s$ based on $$n_s = \frac{\vec{h}'}{\|\vec{h}\|^2} \vec{\tilde{n}}_r,$$

where $\vec{\tilde{n}}_r$ represents the residual noise vector, $\vec{h}'$ represents a Hermitian transpose of a channel transfer function vector $\vec{h}$ comprising the plurality of channel transfer elements for the first antenna layer, and $\|\vec{h}\|^2$ represents a squared norm value of the channel transfer function vector $\vec{h}$ for the first antenna layer.

18. The MIMO decoding system of claim 14 wherein the likelihood indicium for each bit is determined based on $$[x + \text{Re}(y^* \; n_s)] \frac{1}{d},$$

where x and y are distance information for each bit, $n_s$ represents a decorrelation value, Re(complex number) represents a real part of the complex, number, and d is indicative of inverse channel gain.

19. The MIMO decoding system of claim 18 wherein the MIMO decoder is further adapted to generate the decorrelation value $n_s$ based on $$n_s = \frac{\vec{h}'}{\|\vec{h}\|^2} \vec{\tilde{n}}_r,$$

where $\vec{\tilde{n}}_r$ represents a residual noise vector, $\vec{h}'$ represents a Hermitian transpose of a channel transfer function vector $\vec{h}$ comprising the plurality of channel transfer elements for the first antenna layer, and $\|\vec{h}\|^2$ represents a squared norm value of the channel transfer function vector $\vec{h}$ for the first antenna layer.

20. The MIMO decoding system of claim 18 wherein the MIMO decoder is further adapted to:
  obtain a channel matrix comprising channel transfer elements corresponding to different channels in the MIMO wireless communication system, wherein each column of channel transfer elements of the channel matrix corresponds to one antenna layer of the plurality of antenna layers, each of the plurality of antenna layers associated with a transmitted data stream that was transmitted from a transmit antenna;
  generate a Hermitian transpose of the channel matrix;
  generate a product of the Hermitian transpose of the channel matrix and the channel matrix to provide a first product having a plurality of diagonal elements; and
  generate a partial matrix inversion for the plurality of diagonal elements of the first product to provide a diagonal vector, wherein d is a function of the diagonal vector.

21. The MIMO decoding system of claim 14 wherein symbols transmitted in a first data stream corresponding to a first of the plurality of antenna layers are modulated using a first type of modulation, symbols transmitted in a second data stream corresponding to a second of the plurality of antenna layers are modulated using a second type of modulation, which is different than the first type of modulation, and the look-up table comprises distance information corresponding to the distance between the potential candidate symbol and the most proximate competing symbol for each bit of a plurality of potential candidate symbols for both the first type of modulation and the second type of modulation.

22. The MIMO decoding system of claim 21 wherein the first type of modulation and the second type of modulation are selected from a group consisting of quadrature phase shift keying modulation, $n^{th}$ order quadrature amplitude modulation where n is an integer, and any constellation based modulation.

23. The MIMO decoding system of claim 14 wherein the MIMO decoder is further adapted to:
    select a second candidate symbol from the plurality of candidate symbols, wherein the second candidate symbol corresponds to a second potential candidate symbol of the plurality of candidate symbols;
    obtain the distance information for each bit of the second potential candidate symbol from the look-up table; and
    determine likelihood indicium for each bit of the second candidate symbol as a function of the distance information for each bit of the second potential candidate symbol, wherein the likelihood indicium for a given bit is indicative of a likelihood that a value for the given bit is a logic 1 or a logic 0.

24. The MIMO decoding system of claim 23 wherein the first candidate symbol corresponds to a different type of modulation than the second candidate symbol.

25. The MIMO decoding system of claim 14 wherein there are two antenna layers, and the likelihood indicium for each bit is determined based on $$\frac{\Delta}{\|\vec{h}_1\|^2 \|h_2\|^2} \left( x \|\vec{h}_j\|^2 + \mathrm{Re}(y^* \, \vec{h}_j' \, \vec{n}_r) \right),$$

where j corresponds to a $j^{th}$ antenna layer for the first candidate symbol being processed, $\vec{h}_1$ is a first of two channel transfer function vectors $\vec{h}$, $\vec{h}_2$ is a second of the two channel transfer functions vectors, $\vec{h}_j$ is the channel transfer function vector for $j^{th}$ antenna layer, $\vec{h}_j'$ is a Hermitian transpose of $\vec{h}_j$, $\|\vec{h}_j\|^2$ represents a squared norm value of the channel transfer function vector $\vec{h}_j$, $\vec{n}_r$ is a residual noise vector, x and y are distance information for each bit of the first candidate symbol, Re(complex number) represents a real part of the complex number, and $\Delta$ represents a determinant of $[H'H]^{-1}$, where H' is a Hermitian transpose of the overall channel matrix H.

* * * * *